United States Patent Office 3,436,401
Patented Apr. 1, 1969

3,436,401
BENZOLYAMINO-ANTHRAQUINONES
Xaver Pfister, Riehen, Basel, Switzerland, assignor to Sandoz Ltd. (also known as Sandoz A.G.), Basel, Switzerland
No Drawing. Filed Sept. 14, 1964, Sre. No. 396,421
Claims priority, application Switzerland, Sept. 13, 1963, 11,356/63, 11,357/63
Int. Cl. C09b 1/36, 1/42
U.S. Cl. 260—326                           6 Claims

ABSTRACT OF THE DISCLOSURE

Pigments free from sulfonic acid groups and having in their molecular structure a group of the formula

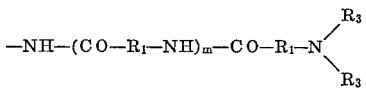

when used for the coloration of paper, natural and synthetic resins in the mass or in solution, rubber and plastics, and for the printing of textiles and paper, display good hiding power, good light fastness and excellent resistance to migration.

This invention relates to new pigments which contain in the molecule at least one but preferably not more than two groups of the formula

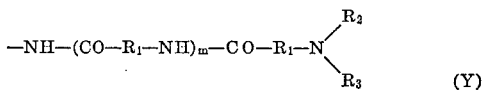

and are free from sulphonic acid groups, to the production of these pigments and to their uses. In the Formula Y, $R_1$ represents identical or different, substituted or unsubstituted hydrocarbon radicals, $R_2$ and $R_3$ represent, independently of each other, hydrogen, substituted or unsubstituted hydrocarbon radicals or acyl radicals, and $m$ represents 0, 1 or 2.

For example, $R_1$ can stand for arylene radicals which may bear substituents that are not water-solubilising, i.e. arylene radicals not substituted by sulphonic acid or carboxyl groups; $R_2$ and $R_3$ can represent low-molecular, substituted or unsubstituted alkyl groups, or $R_2$ and $R_3$, together with the nitrogen atom bound to them, can represent one of the following radicals: —NH—CO—$R_4$,

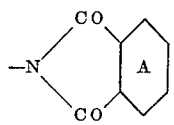

or

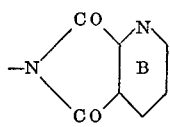

where $R_4$ represents a saturated or unsaturated, low-molecular, unsubstituted or substituted aliphatic radical, an iso-cyclic or heterocyclic radical, e.g. a phenyl, which may be substituted by halogen, nitro, low-molecular alkyl or alkoxy, cyclohexyl, furyl, thienyl or anthraquinoyl radical; and where the rings A and B may be substituted.

$R_1$ represents, preferably, phenylene which may be unsubstituted or substituted by halogen or low-molecular alkyl, e.g. by fluorine, chlorine, bromine, methyl, ethyl or propyl. $R_2$ is preferably hydrogen. $R_3$ can represent, e.g., acetyl, propionyl, acryloyl, chloroacetyl, butyryl, benzoyl, hexahydrobenzoyl, 2-, 3- or 4-chlorobenzoyl, 2-, 3- or 4-bromobenzoyl, 2-, 3- or 4-fluorobenzoyl, 3,4-dichlorobenzoyl, 2,4 - dichlorobenzoyl, 2,4,6 - trichlorobenzoyl, 2,4-dibromobenzoyl, 3-nitrobenzoyl, 4-nitrobenzoyl, 2-chloro-4-nitrobenzoyl, 2-, 3- or 4-methylbenzoyl, 3-methyl-4-nitrobenzoyl, 4-methoxybenzoyl, 3,4,5-trimethoxybenzoyl, 2-furylcarbonyl, 2-thienylcarbonyl, 2-anthraquinoylcarbonyl; or $R_2$ and $R_3$ jointly can represent, e.g., benzene-1,2-dicarbonyl, halogenobenzene-2,3-dicarbonyl or pyridine-2,3-dicarbonyl.

The preferred groups of pigments containing at least one radical (Y) are, e.g., the anthraquinones, 1,9-isothiazolanthrones, anthrapyridines, 1,2-benzanthraquinoneacridones, anthrapyrimidines, anthrapyridones, 1,2-naphthoanthraquinoneacridones, 1,2′-dianthrimides and oxazolanthrones, i.e. pigments which consist of more than two condensed benzene rings and may contain condensed 5 membered rings.

Particularly valuable anthraquinone pigments are those containing a group (Y) in an α position and, if desired, another group (Y) in a second α position and other non-water-solubilising substituents, e.g. pigments of the formula

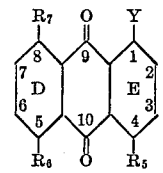

(III)

In this formula $R_5$ represents hydrogen, a radical of Formula Y, a substituted or unsubstituted amino group, hydroxyl, substituted or unsubstituted low-molecular alkoxy, a thioether group or sulphonyl radical; $R_6$ hydrogen, a substittued or unsubstituted amino group, hydroxyl or a thioether group; and $R_7$, hydrogen, a substituted or unsubstituted amino group, hydroxyl or thioether group.

The rings D and E can bear further substituents, preferably halogen, cyan, low-molecular substituted or unsubstituted alkoxy, substituted or unsubstituted aryloxy, e.g. phenyloxy, substituted or unsubstituted low-molecular alkymercapto, or substituted or unsubstituted arylmercapto, e.g. phenylmercapto, in particular chlorine, bromine, methoxy, cyan or methylmercapto in the 2 position or chlorine, bromine or cyan in the 2- and 3-positions.

Thus $R_5$ can represent, e.g., besides hydrogen, amino, methylamino, cyclohexylamino, phenylamino, 4-chlorophenylamino, 3-chlorophenylamino, 4-methoxyphenylamino, 4 - methylphenylamino, 2,4,6 - trimethoxylphenylamino, 2,4-dimethyl-phenylamino, 2,6-dimethyl-phenylamino, low-molecular alkanoylamino, benzoylamino, 2-, 3- or 4-chlorobenzoylamino, 2-, 3- or 4-bromobenzoylamino, 2-, 3- or 4-fluorobenzoylamino, 2-, 3- or 4-methylbenzoylamino, nitrobenzoylamino, methoxybenzoylamino, hydroxyl, methoxy, phenylmercapto, 2-, 3- or 4-methylphenylmercapto or 2-, 3- or 4-chlorophenylmercapto, 1-naphthylmercapto, phenylsulphonyl, 2-methylphenylsulphonyl or 1-naphthylsulphonyl. $R_6$ and $R_7$ represent, e.g., one of the aforenamed amino or thioether radicals or hydroxyl. $R_6$ represents preferably hydrogen, amino, phenylamino, mono-, di- or tri-methylphenylamino, acetylamino, or substituted or unsubstituted benoylamino, and $R_7$ represents preferably hydrogen or amino.

Specially preferred 1,9-iso-thiazolanthrones are those of the formula

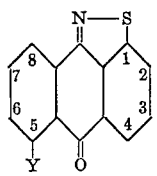

(IV)

In the preferred anthrapyrimidines the Y group is in the 4 or 5 position:

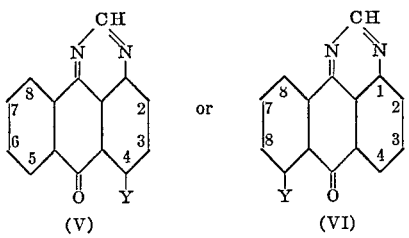

The most important 1,2-benzoanthraquinoneacridones have the formula

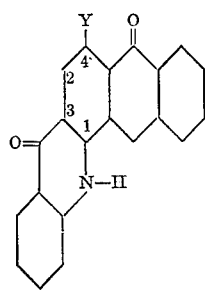

(VII)

and the most valuable anthrapyridones the formula

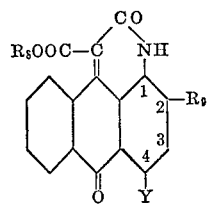

(VIII)

wherein $R_8$ represents low-molecular alkyl, preferably methyl or ethyl, and $R_9$ hydrogen, low-molecular alkyl or halogen, preferably methyl, chlorine, or bromine. The most important anthrapyridines have the formula

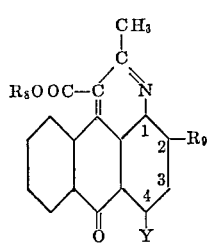

(IX)

Throughout this specification the terms "low-molecular alkyl" and "alkoxy radicals" refer preferably to those having 1 to 4 carbon atoms.

The new pigment are produced preferably by introducing radicals of the formula

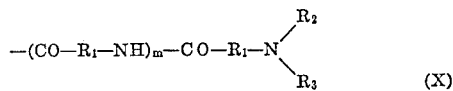

(X)

into an amino dye of the formula $$F-(NH_2)_n \qquad (XI)$$

In Formula XI F represents the radical of a dye and $n$ a low integer, preferably 1 or 2.

In general, the process of production consists in the acylation of 1 mole of an amino dye of Formula XI with $n$ moles of a carboxylic acid of formula $$HOOC-R_1-Z \qquad (XII)$$

in which Z represents the nitro group, an acylamino or sulphonyl amino group or the radical $-N=S=O$, or with $n$ moles of one of its functional derivatives, e.g. an ester, anhydride or halide, and the conversion of the radical Z into the amino group, e.g., by reduction or saponification. These reactions can be carried out in either order and are continued until the side chain is of the desired length. Finally, the terminal amino group is acylated or deacylated.

The acylation reaction is effected preferably in the presence of a diluent, e.g. an aromatic hydrocarbon, if desired a halogenated or nitrated type, or an ether or substituted or unsubstituted acid amide, within the temperature range of about 80–160° C. It is beneficial to use an acid-binding agent, e.g. pyridine, trimethylamine, sodium carbonate or sodium bicarbonate.

The new compounds thus obtained are valuable pigments, sparingly soluble to insoluble in the commonly used solvents. They can be converted into commercial pigment pastes by grinding, e.g. in roller or ball mills, if required with the addition of dispersing agents, e.g. condensation products of naphthalenesulphonic acids and formaldehyde, followed by drying in a jet or vacuum drier. The pigments are suitable for the coloration of paper, natural and synthetic resins in the mass or in solution, rubber and plastics, and for the printing of textiles and paper. In these materials they have good hiding power, good light fastness and excellent resistance to migration. In resistance to migration in polyvinyl chloride they are clearly superior to the known benzoylaminoanthraquinones, e.g. 1-benzoylamino-4-hydroxyanthraquinone, 1,4-di-(benzoylamino)-anthraquinone and 1,4-di (3′-methoxybenzoylamino)-anthraquinone.

In the following examples the parts and percentages are by weight and the temperatures in degrees centigrade.

EXAMPLE 1

22.3 parts of 1-aminoanthraquinone are dispersed in 300 parts of chlorobenzene. A solution of 24 parts of 4-nitrobenzoyl chloride in 30 parts of chlorobenzene is added dropwise in 1 hour at 125–130°. Stirring is continued for 1 hour at 130°, then the suspension is allowed to cool to room temperature, the product filtered off, washed with chlorobenzene, then with alcohol and finally with water, and dried at 100°.

30 parts of the resulting 1-(4′-nitro)-benzoylaminoanthraquinone and 47 parts of sodium sulphide 60% are stirred in 500 parts of alcohol for 1 hour at 80°. The product is filtered off at the same temperature, washed with alcohol and then with cold water until of neutral reaction and dried at 100°.

6.8 parts of the resulting 1-(4′-amino)-benzoylaminoanthraquinone, 4.6 parts of 4-acetylaminobenzoyl chloride (prepared by reacting 4-acetylaminobenzoic acid with thionyl chloride in dioxan at 60° and evaporation of the solvent in vacuum) and 4 parts of pyridine are stirred for 4 hours in 120 parts of chlorobenzene at 130°. The product is filtered off hot, washed with chlorobenzene, then with alcohol and finally with water, dried at 100° and ground to give a pigment which colours polyvinyl chloride in yellow shades that are resistant to migration.

EXAMPLE 2

25.2 parts of 5-amino-1,9-iso-thiazolanthrone and 24 parts of 4-nitrobenzoyl chloride are stirred in 400 parts of chlorobenzene for 3 hours at 130°. The mixture is allowed to cool to 50°, the product filtered off at this temperature, washed with chlorobenzene, then with alcohol and finally with water and dried at 100°.

30 parts of the resulting 5-(4'-nitro)-benzoylamino-1,9-iso-thiazolanthrone and 30 parts of sodium sulphide 60% are heated in 600 parts of alcohol for 3 hours at 80°. The product is filtered off at 80°, washed clear with alcohol and then with water until of neutral reaction and dried at 100°.

7.4 parts of the resulting 5-(4'-amino)-benzoylamino-1,9-iso-thiazolanthrone, 7.4 parts of 4-phthaliminobenzoyl chloride (produced by reaction of 4-phthaliminobenzoic acid with thionyl chloride in dioxan at 60° and evaporation of the solvent in vacuum) and 3 parts of pyridine are added to 150 parts of chlorobenzene and heated at 130° for 2 hours. The product is filtered off hot, washed successively with chlorobenzene, alcohol and water, dried at 100° and ground. A pigment is obtained which colours polyvinyl chloride in yellow shades resistant to migration.

EXAMPLE 3

17.8 parts of 1-aminoanthraquinone and 16.4 parts of 4-thionylaminobenzoyl chloride (J. Pr. Chem., 148, 167 (1937)) are stirred in 200 parts of anhydrous chlorobenzene for 2 hours at 110°. On cooling to 30° the suspension is filtered, the residue washed with chlorobenzene, then with alcohol and finally with water, treated for 30 minutes in 300 parts of water at 90°, filtered off, washed with water until neutral and dried.

13.6 parts of the 1-(4'-amino)-benzoylaminoanthraquinone thus formed, 13.6 parts of 4-benzoylaminobenzoyl chloride (prepared by reacting 4-benzoylaminobenzoic acid with thionyl chloride in dioxan and evaporation in vacuum) and 6 parts of pyridine are heated in 250 parts of ortho-dichlorobenzene for 1 hour at 140°. The product is filtered off hot, washed with o-dichlorobenzene, then with alcohol and finally with water, and dried. A pigment is obtained which, when worked up by one of the standard methods of pigment production, colours polyvinyl chloride in yellow shades resistant to migration.

EXAMPLE 4

31.4 parts of 1-amino-4-phenylaminoanthraquinone and 24 parts of 4-nitrobenzoyl chloride are heated in 300 parts of chlorobenzene for 3 hours at 130°. The suspension is allowed to cool to room temperature, the product filtered off, washed with chlorobenezne, alcohol and water, and dried at 100°.

46.3 parts of the 1-(4'-nitro)-benzoylamino-4-phenylaminoanthraquinone formed are heated with 58 parts of sodium sulphide 60% in 800 parts of alcohol for 1 hour at 80°. The product is filtered off at this temperature, washed with alcohol and then with water until of neutral reaction, and dried. 35.2 parts of the resulting 1-(4'-amino)-benzoylamino-4-phenylaminoanthraquinone and 19.3 parts of 4-nitrobenzoyl chloride are heated in 400 parts of ortho-dichlorobenzene for 3 hours at 125°. The suspension is cooled to 50°, the product filtered off, washed with ortho-dichlorobenzene and then with alcohol. While still alcohol-moist it is suspended in 700 parts of alcohol containing 47 parts of sodium sulphide 60%, the suspension heated for 3 hours at 80°, the product filtered off at this temperature, washed with alcohol and then with water until of neutral reaction, and dried.

28.7 parts of the resulting 1-[((4"-amino))-(4'-benzoylamino)-benzoylamino]-4-phenylaminoanthraquinone, 17 parts of 4-benzoylaminobenzoyl chloride and 10 parts of pyridine are heated in 300 parts of nitrobenzene for 3 hours at 125° with stirring. The suspension is filtered at 125° and the product washed with nitrobenzene, then with alcohol and finally with water. It pigments polyvinyl chloride in violet shades resistant to migration.

EXAMPLE 5

When 31.4 parts of 1-amino-4-phenylaminoanthraquinone in Example 4 are replaced by 35.6 parts of 1-amino-5-(2',4',6'-trimethyl)-phenylaminoanthraquinone, a red compound is obtained with which polyvinyl chloride can be pigmented in non-migrating shades.

EXAMPLE 6

22.5 parts of 1-aminoanthraquinone, 37 parts of 4-phthaliminobenzoyl chloride and 9 parts of pyridine are stirred in 400 parts of chlorobenzene for 3 hours at 130°. The product is filtered off at 130°, washed consecutively with chlorobenzene, alcohol and water and dried at 100°.

20 parts of the resulting 1-(4'-phthalimino)-benzoylaminoanthraquinone are heated in 200 parts of dimethyl formamide at 120°. 6 parts of hydrazine hydrate are added dropwise in the course of 15 minutes, stirring is continued for 1 hour at 120°, the mass allowed to cool to 20° and the product filtered off at 20°, washed with dimethyl formamide and then with water, and dried at 100°.

15.6 parts of the 1-(4'-amino)-benzoylaminoanthraquinone thus obtained, 14.8 parts of 4-phthaliminobenzoylchloride and 5 parts of pyridine are boiled in 200 parts of chlorobenzene for 4 hours. The product is filtered off hot, washed with chlorobenzene, alcohol and finally with water, and dried at 100°. It is then heated for 3 hours at 150° in 300 parts of dimethyl formamide, and on cooling filtered off at 20°, washed with dimethyl formamide and with water, and dried. 1-[((4"-phthalimino))-(4' - benzoylamino) - benzoylamino] - anthraquinone is obtained, which pigments polyvinyl chloride in migration-resistant yellow shades.

EXAMPLE 7

11.8 parts of 1-[((4" - phthalimino)) - (4'-benzoylamino)-benzoylamino]-anthraquinone are added to 100 parts of dimethyl formamide and in the course of 15 minutes 3 parts of hydrazine hydrate are added with stirring. After stirring for a further hour at 120°, the product is filtered off hot, washed with dimethyl formamide and then with water, and dried at 100°.

9.2 parts of the resulting 1-[((4"-amino))-(4'-benzoylamino)-benzoylamino]-anthraquinone are added to 300 parts of chlorobenzene with the subsequent addition of 2 parts of pyridine and 5.3 parts of 5-chlorobenzoyl chloride. The reaction mixture is heated at 130° for 10 hours, then the product is filtered off hot, washed with chlorobenzene, alcohol and finally with water, and dried at 100°.

The pigment formed is added to 300 parts of dimethyl formamide, heated for 2 hours at 150°, filtered off hot, washed with dimethyl formamide and then with water, dried at 100°, and ground. A pigment is obtained which pigments polyvinyl chloride in migration-resistant yellow shades. Pigments having equally good resistance to migration are obtained when 1 mole of one of the aminoanthraquinones (A) listed in the following table is converted into the corresponding [((4" - amino)) - (4' - benzoylamino) - benzoylamino] - anthraquinone and this reacted with the benzoyl derivative (B), using one of the procedures set out in Examples 1 to 7.

TABLE 1

| Example No. | A | B | Colour in Polyvinyl Chloride |
|---|---|---|---|
| 8 | 1-amino-4-phenylmercaptoanthraquinone | 3,4-dichlorobenzoyl chloride | Red. |
| 9 | do | 2,4-dichlorobenzoyl chloride | Red. |
| 10 | 1-amino-4-(4'-chloro)-phenylmercaptoanthraquinone | do | Red. |
| 11 | do | 3,4-dichlorobenzoyl chloride | Red. |
| 12 | 1-aminoanthraquinone | 4-phthaliminobenzoyl chloride | Yellow. |
| 13 | do | 4-nitrobenzoyl chloride | Do. |
| 14 | do | 3-nitrobenzoyl chloride | Do. |
| 15 | do | 2-chlorobenzoyl chloride | Do. |
| 16 | do | 3-chlorobenzoyl chloride | Do. |
| 17 | do | 3-toluic acid chloride | Do. |
| 18 | do | 4-toluic acid chloride | Do. |
| 19 | do | 4-bromobenzoyl chloride | Do. |
| 20 | do | 4-flourobenzoyl chloride | Do. |
| 21 | do | 4-methoxybenzoyl chloride | Do. |
| 22 | do | 3,4,5-trimethoxybenzoyl chloride | Do. |
| 23 | do | 3,4-dichlorobenzoyl chloride | Do. |
| 24 | do | 2,4-dichlorobenzoyl chloride | Do. |
| 25 | do | 2-chloro-4-nitrobenzoyl chloride | Do. |
| 26 | 1-amino-4-(2''-chloro)-phenylmercaptoanthraquinone | Benzoyl chloride | Yellowish red. |
| 27 | 1-amino-4-(3'-methyl)-phenylmercaptoanthraquinone | 3,4-dichlorobenzoyl chloride | Red. |
| 28 | do | 2,4-dichlorobenzoyl chloride | Red. |
| 29 | 1-amino-4-(2'-methyl)-phenylmercaptoanthraquinone | do | Red. |
| 30 | do | 3,4-dichlorobenzoyl chloride | Red. |
| 31 | 5-amino-1,4-di-(4'-chlorobenzoylamino)-anthraquinone | Benzoyl chloride | Red. |

EXAMPLE 32

84 parts of 1-amino-4-benzoylaminoanthraquinone are suspended in 800 parts of chlorobenzene. 28 parts of pyridine and 65 parts of 4-nitrobenzoyl chloride are added and the suspension stirred for 3 hours at 130°, after which it is allowed to cool to 20° and the product filtered off, washed successively with chlorobenzene, alcohol and water, and dried at 100°.

8.4 parts of sodium sulphide 84% and 3.8 parts of sodium hydrogen carbonate are stirred in 200 parts of alcohol for 30 minutes at 60°. 14.8 parts of the previously obtained 1-(4'-nitro)-benzoylamino-4-benzoylaminoanthraquinone are added in 15 minutes at the same temperature and stirring continued at 60°. The product is filtered off at 60°, washed with alcohol and then with hot water until of neutral reaction, and dried at 100°.

11.5 parts of the resulting 1-(4'-amino)-benzoyl-amino-4-benzoyl-amino-anthraquinone, 8.4 parts of 4-benzoyl-aminobenzoyl chloride and 2.6 parts of pyridine are stirred in 300 parts of chlorobenzene for 3 hours at 130°. The product is filtered off at 130°, washed successively with chlorobenzene, alcohol and water, and dried at 100°.

The resulting 1-{[(4'' - benzoylamino) - 4' - benzoylamino] - benzoylamino} - 4 - benzoylaminoanthraquinone formed is added to 300 parts of dimethyl formamide, heated for 2 hours at 150°, filtered off at the same temperature, washed with dimethyl formamide and then with water, dried at 100°, and ground to give a pigment which pigments polyvinyl chloride in migration-resistant red shades.

The pigments described in the following table are produced in accordance with the procedure of Example 32 by reaction of an aminoanthraquinone (A) with 4-nitrobenzoyl chloride, reduction of the reaction product to (4'-amino)-benzoylaminoanthraquinone and reaction with a benzoyl derivative (B).

TABLE 2

| Example No. | A | B | Colour of Pigment |
|---|---|---|---|
| 33 | 1-amino-4-methoxyanthraquinone | 4-phthaliminobenzoyl chloride | Orange. |
| 34 | do | 4-benzoylaminobenzoyl chloride | Do. |
| 35 | 1-amino-4-hydroxyanthraquinone | do | Red. |
| 36 | 1-amino-4-phenylaminoanthraquinone | do | Violet. |
| 37 | do | 4-phthaliminobenzoyl chloride | Do. |
| 38 | 1-amino-5,8-di-benzoylaminoanthraquinone | do | Bordeaux. |
| 39 | do | 4-benzoylaminobenzoyl chloride | Bluish red. |
| 40 | 1-amino-5-benzoylaminoanthraquinone | do | Reddish yellow. |
| 41 | 1-amino-4-(4'-methyl)-phenylmercaptoanthraquinone | do | Red. |
| 42 | 1-amino-4-(2',4',6'-trimethyl)-phenylaminoanthraquinone | do | Violet. |
| 43 | 1-amino-4-α-naphthylmercaptoanthraquinone | do | Red. |
| 44 | do | 4-phthaliminobenzoyl chloride | Bordeaux. |
| 45 | 1-amino-4-(4'-chloro)-phenylaminoanthraquinone | do | Red. |
| 46 | do | 4-benzoylaminobenzoyl chloride | Do. |
| 47 | 1-amino-4-α-naphthylsulfonylanthraquinone | do | Reddish yellow. |
| 48 | 1-amino-4-(4'-methoxy)-phenylaminoanthraquinone | do | Violet. |
| 49 | do | 4-phthaliminobenzoyl chloride | Do. |
| 50 | 1-amino-4-phenylmercaptoanthraquinone | do | Red. |
| 51 | do | 4-benzoylaminobenzoyl chloride | Red. |
| 52 | 1-amino-4-(4'-chloro)-phenylmercaptoanthraquinone | do | Red. |
| 53 | do | 4-phthaliminobenzoyl chloride | Red. |
| 54 | 1-amino-4-phenylsulphonylanthraquinone | do | Reddish yellow. |
| 55 | do | 4-benzoylaminobenzoyl chloride | Do. |
| 56 | 1-amino-4-(3'-methyl)-phenylmercaptoanthraquinone | do | Red. |
| 57 | do | 4-phthaliminobenzoyl chloride | Red. |
| 58 | 2-amino-3,4-phthaloylacridone | do | Blue-violet. |
| 59 | do | 4-benzoylaminobenzoyl chloride | Do. |
| 60 | 4-aminoanthrapyrimidine | do | Yellow. |
| 61 | do | 4-phthaliminobenzoyl chloride | Do. |
| 62 | 5-aminoanthrapyrimidine | do | Do. |
| 63 | do | 4-benzoylaminobenzoyl chloride | Do. |
| 64 | 1-carbethoxy-2-keto-4-methyl-6-aminoazo-(3)-benzanthrone | do | Scarlet. |
| 65 | 1-amino-4-(2'-methyl)-phenylmercaptoanthraquinone | do | Do. |
| 66 | do | 4-phthaliminobenzoyl chloride | Do. |
| 67 | 1-amino-4-(3'-methyl)-phenylsulfonylanthraquinone | do | Reddish yellow. |
| 68 | do | 4-benzoylaminobenzoyl chloride | Do. |

EXAMPLE 69

67 parts of 1-aminoanthraquinone are added to 800 parts of chlorobenzene, followed by 26 parts of pyridine and 78 parts of 3-methyl-4-nitrobenzoyl chloride. The mixture is heated at 130° for 3 hours with stirring, then allowed to cool to 20°, and the product filtered off, washed successively with chlorobenzene, alcohol and water, and dried at 100°.

56 parts of sodium sulphide 84% and 25 parts of sodium hydrogen carbonate are added to 900 parts of alcohol and stirred for 30 minutes at 60°. 77 parts of the 1-[(3'-methyl-4'-nitro)-benzoylamino]anthraquinone obtained by the above reaction is added at the same temperature in the course of 30 minutes. Stirring is continued for 1 hour at 60° and thereafter for 2 hours at 80°. The product is filtered off at 80°, washed with alcohol and then with hot water, and dried at 100°.

54 parts of the resulting 1-[(3'-methyl-4'-amino)-benzoylamino]-anthraquinone are added, together with 26 parts of pyridine, to 800 parts of chlorobenzene and heated at 125°. In the course of 1 hour a solution of 39 parts of 3-methyl-4-nitrobenzoyl chloride in 80 parts of chlorobenzene is added dropwise, then stirring is continued for 3 hours at 125–130°. The reaction mixture is allowed to cool to 20°, the product filtered off, washed successively with chlorobenzene, alcohol and water, and dried at 100°.

72 parts of sodium sulphide 60% and 31 parts of sodium hydrogen carbonate are added to 900 parts of alcohol and stirred for 30 minutes. 65 parts of the previously obtained 1-[((3''-methyl-4''-nitro))-(3'-methyl-4'-benzoylamino)-benzoylamino]-anthraquinone are added in 30 minutes at 60° and stirring continued for 2 hours at this temperature. The product is filtered off at 60° and washed with alcohol and hot water.

12.2 parts of the resulting 1-[((3''-methyl-4''-amino))-(3' - methyl - 4' - benzoylamino) - benzoylamino] - anthraquinone are heated with 3 parts of pyridine and 4.6 parts of benzoyl chloride for 10 hours at 125–130° with stirring. The product is filtered off hot, washed with chlorobenzene, then with alcohol and finally with water, and dried at 100°. The compound formed is heated in 300 parts of dimethyl formamide for 1 hour. On cooling it is filtered off at 20°, washed with dimethyl formamide and then with water, dried at 100° and ground. A pigment is obtained which gives migration-resistant yellow colorations in polyvinyl chloride.

The migration-resistant pigments itemised in Table 3 below are obtained by the reaction of 1 mole of 1-aminoanthraquinone with 1 mole of a benzoyl chloride D, then with 1 mole of a benzoyl chloride E and finally with 1 mole of a benzoyl chloride F, the nitro groups being reduced before each succesive reaction.

The operating procedure is that of Example 69.

TABLE 3

| Example No. | D | E | F | Colour of Pigments |
|---|---|---|---|---|
| 70 | 3-methyl-4-nitrobenzoyl chloride | 4-nitrobenzyol chloride | Benzoyl chloride | Yellow. |
| 71 | 2-chloro-4-nitrobenzoyl chloride | do | do | Do. |
| 72 | do | 2-chloro-4-nitrobenzoyl chloride | do | Do. |
| 73 | do | do | 2-chlorobenzoyl chloride | Do. |
| 74 | 4-nitrobenzoyl chloride | do | do | Do. |
| 75 | do | do | Benzoyl chloride | Do. |
| 76 | 3-methyl-4-nitrobenzoyl chloride | 3-methyl-4-nitrobenzoyl chloride | 4-benzoylaminobenzoyl chloride | Do. |

EXAMPLE 77

48 parts of 1,4-diaminoanthraquinone are heated in 400 parts of chlorobenzene at 125°. In the course of 1 hour a solution of 104 parts of 4-nitrobenzoyl chloride in 130 parts of chlorobenzene is added dropwise, causing the hydrogen chloride to escape. Stirring is continued for 3 hours at 130°, then the product is filtered off at this temperature, washed succesively with chlorobenzene, alcohol and water and dried at 100°.

72 parts of a resulting 1,4-di-[(4'-nitro)-benzoylamino]-anthaquinone, 78 parts of sodium sulphide 60% and 31 parts of sodium hydrogen carbonate are added to 900 parts of alcohol and stirred for 2 hours at 60°. The product is filtered off at this temperature, washed with alcohol and then with hot water till of neutral reaction, and dried at 100°.

11.9 parts of the resulting 1,4-di-[(4'-amino)-benzoylamino]-anthraquinone are added, with 15.6 parts of 4-benzoylaminobenzoyl chloride and 4.8 parts of pyridine, to 300 parts of chlorobenzene and heated at 130° for 5 hours. The product is filtered off at this temperature, washed with 300 parts of chlorobenzene and 200 parts of dimethyl formamide, heated in 300 parts of dimethyl formamide for 1 hour, filtered off at 150°, washed with dimethyl formamide and then with water, dried at 100° and ground. The red pigment thus obtained is resistant to migration in the pigmented material.

EXAMPLE 78

8 parts of 1,4 - diamino - 2 - methoxyanthraquinone are added to 400 parts of chlorobenzent with 20.3 parts of 4-benzoylaminobenzoyl chloride and 5.8 parts of pyridine and stirred for 4 hours at 130°. The product is filtered off at the same temperature, washed successively with chlorobenzene, alcohol and water, and dried at 100°.

The pigment formed is stirred in 300 parts of dimethyl formamide for 1 hour at 150°, filtered off at the same temperature, washed with dimethyl formamide and then with water, dried, at 100° and ground. A reddish-yellow pigment resistant to migration is obtained.

The resistance to migration can be assessed as follows: 0.7 part of the pigment is compounded with 100 parts of polyvinyl chloride at 150–160° in a roller mill and extruded as a film. A piece of this film is placed between two white-pigmented polyvinyl chloride films of the same size, the composite specimen stored for 24 hours at 80° under a load of 30 grams per sq. cm. and then examined to ascertain to what degree, if any, the white films have been discoloured by the pigment.

A number of specially preferred pigments of the present invention have the following formulae:

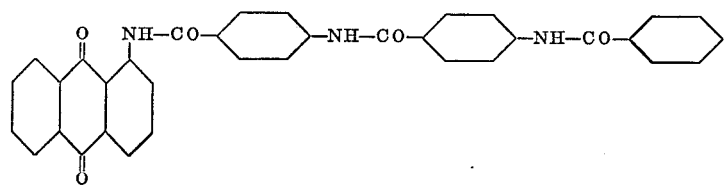

(Example 3)

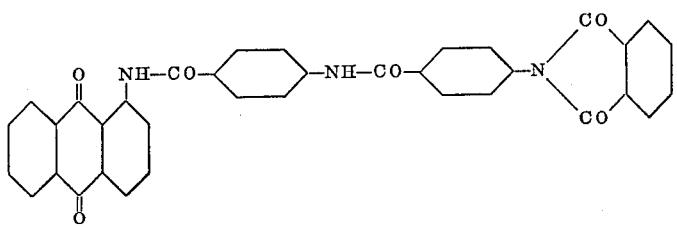

(Example 6)

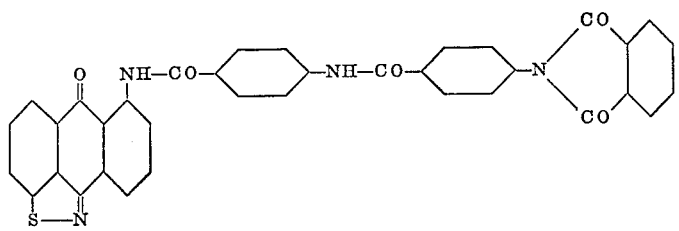

(Example 2)

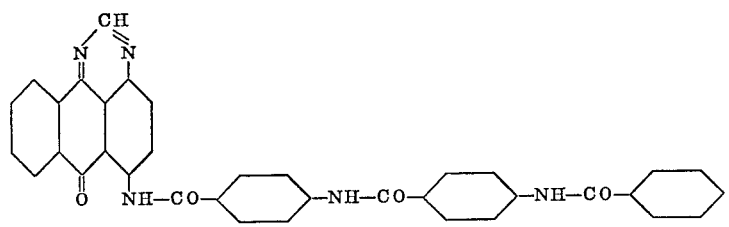

(Example 60)

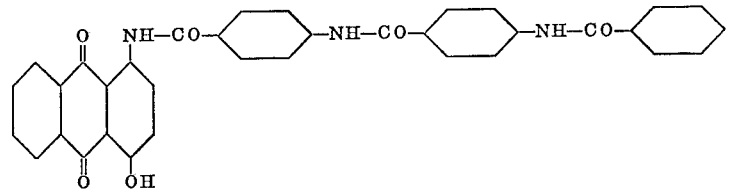

(Example 35)

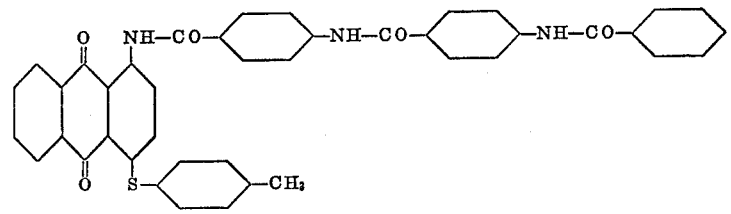

(Example 41)

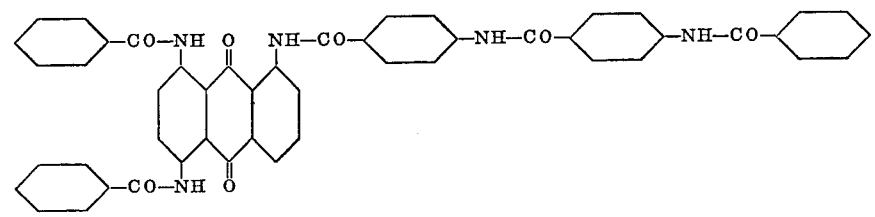

(Example 39)

Examples of application (A) 0.1 part of the dry pigment obtained by the procedure of Example 3 is mixed with 1 part of dioctyl phthalate and the paste added to 100 parts of a previously prepared mixture of 60 parts of polyvinyl chloride, 40 parts of dioctyl phthalate and a small amount of stabiliser. The mass is gelatinised on a roller mill for 10 minutes at 140–150° and passed between the polished plates of a press heated to about 140° The film thus formed is pigmented yellow and shows excellent resistance to migration.

(B) 10 parts of the pigment obtained in accordance with Example 6 are ground with 100 parts of sodium chloride for 48 hours in a ball mill containing porcelain balls. After the balls have been separated, the powder is suspended in 1000 parts of water, then filtered off, washed with water until free of chloride, and dried. 0.5 part of the dried pigment is added to 100 parts of granulated polyethylene terephthalate in a closed vessel and vigorously shaken. The mixture is melted at 265° and spun into a yellow filament having good wet fastness properties.

(C) 100 parts of a commercial nitrocellulose lacquer and 2 parts of the pigment produced according to Example 60 are ground in a ball mill for 48 hours. The pigmented lacquer can be applied by spraying or dipping methods to give yellow coatings with excellent resistance to top finishes.

(D) 20 parts of the pigment obtained according to Example 35 and 120 parts of sodium chloride are ground for 72 hours in a ball mill with iron balls. The balls are separated, the powder suspended in 1000 parts of water, filtered off, and washed with water until free of chloride. It is then fed into a roller mill along with 6.5 parts of sodium dinaphthylmethane disulphonate and a little water and ground to a paste of 20% pigment content. 100 parts of this paste are mixed with 670 parts of an oil-in-water emulsion (prepared with 13.4 parts of an alkylphenyl polyglycolether having 10 ethylene oxide groups, 53.6 parts of water and 603 parts of white spirit) and with 170 parts of a 40% aqueous dispersion of a hydrophilic polyacrylic acid ester, 30 parts of dimethylol urea and 30 parts of 10% ammonium sulphate solution. The paste thus obtained is applied to cotton fabric on a roller printing machine, and the fabric dried and heated for 5 minutes at 150°. A fast red print is obtained.

Having thus disclosed the invention what I claim is:

1. A pigment of the formula

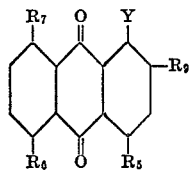

wherein:

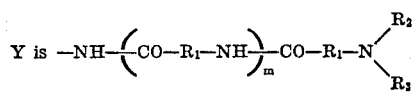

wherein each $R_1$ is a member selected from the group consisting of phenylene, halophenylene and lower alkylphenylene;

$R_2$ is a member selected from the group consisting of hydrogen and, together with $R_3$, a radical of formula

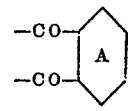

(II)

$R_3$ is a member selected from the group consisting of a benzoyl, halobenzoyl, nitro-benzoyl, lower alkyl-benzoyl, lower alkoxybenzoyl and, together with $R_2$, a radical of the formula

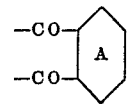

(I)

ring A of Formula I is a member selected from the group consisting of phenylene, halophenylene, lower alkylphenylene and lower alkoxyphenylene;

$R_5$ is a member selected from the group consisting of hydrogen hydroxy, lower alkoxy, phenylamino, methylphenylamino, lower alkylmercapto, phenylmercapto, naphthylmercapto, benzoylamino, phenyl-sulfonyl, methylphenylsulfonyl, naphthylsulfonyl and Y;

each of $R_6$ and $R_7$, independently of each other, is a member selected from the group consisting of hydrogen, benzoylamino and chlorobenzoylamino;

$R_9$ is a member selected from the group consisting of hydrogen and methoxy; and $m$ is 1 or 2.

2. A pigment according to claim 1 wherein $R_2$ and $R_3$, combined with the nitrogen to which both are bonded, is a member selected from the group consisting of phthalimido, halophthalimido, lower alkylphthalimido and lower alkoxyphthalimido.

3. The pigment having the formula

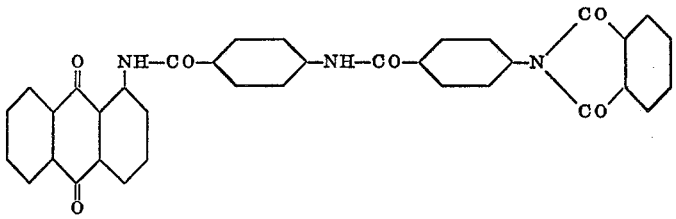

4. The pigment having the formula

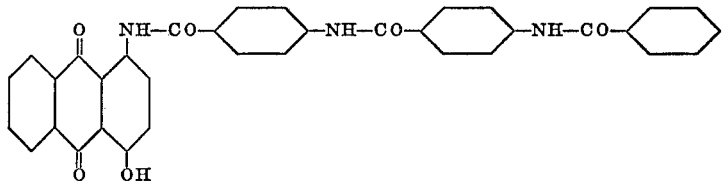

5. The pigment having the formula

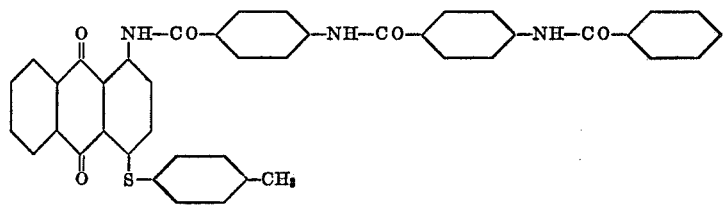

6. The pigment having the formula
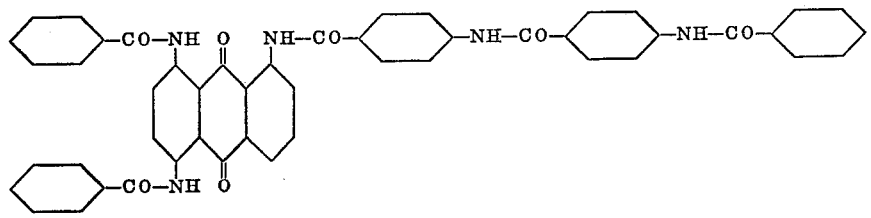
References Cited
UNITED STATES PATENTS
3,356,672  12/1967  Schefizik _____ 260—152
ALEX MAZEL, *Primary Examiner.*
J. A. NARCAVAGE, *Assistant Examiner.*
U.S. Cl. X.R.
8—39, 40; 106—288; 260—41.5, 256.4, 272, 276, 278, 281, 303, 307.5, 377